(12) United States Patent
Jordan

(10) Patent No.: US 10,900,685 B2
(45) Date of Patent: Jan. 26, 2021

(54) DETECTION AND CONTROL DEVICE FOR HVAC SUPPLY VENT

(71) Applicant: Thomas L. Jordan, Washington, PA (US)

(72) Inventor: Thomas L. Jordan, Washington, PA (US)

(*) Notice: Subject to any disclaimer, the term of this patent is extended or adjusted under 35 U.S.C. 154(b) by 0 days.

(21) Appl. No.: 15/978,849

(22) Filed: May 14, 2018

(65) Prior Publication Data

US 2018/0328614 A1 Nov. 15, 2018

Related U.S. Application Data

(60) Provisional application No. 62/505,310, filed on May 12, 2017.

(51) Int. Cl.
| | |
|---|---|
| F24F 11/32 | (2018.01) |
| F24F 11/52 | (2018.01) |
| F24F 11/56 | (2018.01) |
| F24F 11/65 | (2018.01) |
| G05B 15/02 | (2006.01) |
| F24F 11/70 | (2018.01) |
| F24F 13/075 | (2006.01) |
| F24F 11/63 | (2018.01) |

(Continued)

(52) U.S. Cl.
CPC .............. *F24F 11/32* (2018.01); *F24F 11/52* (2018.01); *F24F 11/56* (2018.01); *F24F 11/65* (2018.01); *F24F 11/70* (2018.01); *G05B 15/02* (2013.01); *F24F 11/58* (2018.01); *F24F 11/63* (2018.01); *F24F 11/88* (2018.01); *F24F 13/075* (2013.01); *F24F 2013/207* (2013.01); *F24F 2110/10* (2018.01); *F24F 2110/65* (2018.01); *F24F 2110/72* (2018.01); *F24F 2120/14* (2018.01); *G05B 2219/2614* (2013.01)

(58) Field of Classification Search
CPC .. F24F 11/32; F24F 11/65; F24F 11/52; F24F 11/70; F24F 11/56; F24F 11/58; F24F 11/63; F24F 2120/14; F24F 2013/207; F24F 13/075; F24F 2110/10; F24F 11/88; F24F 2110/72; F24F 2110/65; G05B 15/02; G05B 2219/2614
See application file for complete search history.

(56) References Cited

U.S. PATENT DOCUMENTS

| | | |
|---|---|---|
| 5,793,296 A | 8/1998 | Lewkowicz |
| 6,045,352 A | 4/2000 | Nicholson |

(Continued)

*Primary Examiner* — Thomas C Lee
*Assistant Examiner* — Anzuman Sharmin
(74) *Attorney, Agent, or Firm* — The Webb Law Firm

(57) ABSTRACT

A detection and control device for a supply vent of a heating or cooling system includes a housing attachable to the supply vent, a display configured to present a message to a user, at least one sensor configured to measure at least one parameter, and a central processing unit. The central processing unit is programmed or configured to receive an input from the at least one sensor, determine based on the input received from the at least one sensor if one or more of the parameters measured by the at least one sensor is within a predefined safe zone, and generate and communicate an instruction to turn off a component of the heating or cooling system based at least partially on a determination that one or more of the parameters measured by the at least one sensor is outside of the predefined safe zone.

7 Claims, 9 Drawing Sheets

(51) Int. Cl.
*F24F 11/58* (2018.01)
*F24F 120/14* (2018.01)
*F24F 110/72* (2018.01)
*F24F 11/88* (2018.01)
*F24F 110/10* (2018.01)
*F24F 110/65* (2018.01)
*F24F 13/20* (2006.01)

(56) References Cited

U.S. PATENT DOCUMENTS

| | | |
|---|---|---|
| 6,989,757 B2 | 1/2006 | Geoffrey J. et al. |
| 2009/0065595 A1* | 3/2009 | Kates .................... F24F 3/0442 236/49.3 |
| 2010/0292960 A1* | 11/2010 | Sung ....................... F24F 11/30 702/184 |
| 2011/0170377 A1 | 7/2011 | Legaspi |
| 2012/0251963 A1* | 10/2012 | Barker .................... F23N 5/003 432/1 |
| 2014/0350732 A1* | 11/2014 | Kucera .................... F24F 11/30 700/276 |
| 2016/0123587 A1 | 5/2016 | Ventura |
| 2017/0161752 A1* | 6/2017 | Siravuri ............... G06Q 30/016 |
| 2018/0291911 A1* | 10/2018 | Ward ...................... F04B 17/03 |

* cited by examiner

DETECTION AND CONTROL DEVICE FOR HVAC SUPPLY VENT

CROSS REFERENCE TO RELATED APPLICATIONS

This application claims the benefit of U.S. Provisional Application No. 62/505,310, entitled "Temperature Display for HVAC Supply Vent" and filed May 12, 2017, the disclosure of which is hereby incorporated by reference in its entirety.

BACKGROUND OF THE INVENTION

Field of the Invention

The present disclosure is generally directed to a detection and control device for an HVAC supply vent. More particularly, the present disclosure is directed to a detection and control device which performs control actions based on inputs from at least one sensor, such as a temperature sensor and a carbon monoxide detector. The present disclosure is also directed to methods of using the device and a heating and cooling system utilizing the device.

Description of Related Art

Central heating and cooling systems including furnaces, heat pumps, boilers, and air conditioning units are ubiquitous in modern residential and commercial buildings. Typically, such heating and cooling systems are designed to require minimal user intervention beyond setting a thermostat to maintain a desired ambient temperature and periodically replacing air filters. However, this minimal amount of user interaction required to keep these systems operational causes many problems and abnormalities to be overlooked or ignored. This is exacerbated by new developments that allow heating and cooling systems to run more quietly, which further allows some problems to go unnoticed. In the United States, furnaces are typically powered by either a 220 VAC electricity or natural gas, while air conditioning units and heat exchangers are typically powered by 220 VAC electricity. As such, the amount of power available to these systems is quite substantial and dangerous levels of heat can be generated in the event of a malfunction. Gas-powered units additionally have the potential to produce dangerous, or even lethal, levels of carbon monoxide if the supplied gas is not fully combusted during operation of the unit.

One common problem experienced in heating and cooling systems is a failure to shut off due to a faulty thermostat wire. Typically, thermostats are connected via relatively high gauge wire to a low voltage circuit of the heating and cooling system. The thermostat cycles the system on and off via a relay within the thermostat and/or a transformer in the low voltage circuit. The thermostat wire is typically installed to the studs or other structure of the building with staples. Due to the high gauge of the wire and correspondingly thin insulation, the installation staples may chafe the wires over time, eventually leading to short circuit. The short circuit bypasses the thermostat, thus supplying constant power to the transformer and resulting in the heating and cooling system constantly running. Failure of the thermostat relay can result in a similar constant running condition. Eventually, excessive heat generated as a result of the system constantly running can lead to cracked heat exchangers, burn out compressors, and fire.

Another problem commonly experienced in heating and cooling system is restricted air flow due to a user forgetting to change the air filter at the recommended intervals. As the air filter becomes clogged, flow of the heated or cooled air generated by the system is restricted and the heated or cooled air cannot be efficiently dispersed through the building. As such, the heated or cooled air may be trapped in the duct work of the system, and thus the air may be significantly delayed in reaching the thermostat. As such, the thermostat continues to signal the system to produce more heated or cooled air, causing the system to be operated beyond its intended duty cycle. This potentially leads to component failures and a dangerous buildup of heat in the system. Additionally, a clogged filter can cause the system to cycle more frequently, which causes the heat exchangers to experience rapid expansion and contraction leading to cracks.

SUMMARY OF THE INVENTION

In view of the foregoing, there exists a need for detectors which provide conspicuous alerts of faults or abnormalities in the heating and cooling system. Additionally, there exists a need for a device which can automatically shut down the heating and cooling system in the event of a potentially dangerous malfunction. There especially exists a need for a device which can shut down the heating and cooling system without relying on the relay and wiring of the thermostat, which are themselves prone to failure.

Embodiments of the present disclosure are directed to a detection and control device for a supply vent of a heating or cooling system. The device includes a housing attachable to the supply vent of the heating or cooling system, a display configured to present a message to a user, at least one sensor configured to measure at least one parameter, and a central processing unit. The central processing unit is programmed or configured to receive an input from the at least one sensor, determine based on the input received from the at least one sensor if one or more of the parameters measured by the at least one sensor is within a predefined safe zone, and generate and communicate an instruction to turn off a component of the heating or cooling system based at least partially on a determination that one or more of the parameters measured by the at least one sensor is outside of the predefined safe zone.

In some embodiments, the detection and control device further includes a wiring terminal configured to directly connect the central processing unit to a low voltage circuit of the heating or cooling system. Communicating an instruction to turn off a component of the heating of cooling system includes transmitting a control signal from the central processing unit to the low voltage circuit of the heating or cooling system via the wiring terminal.

In some embodiments, the detection and control device further includes a transmitter in communication with the central processing unit. The transmitter is configured to communicate with a thermostat of the heating or cooling system. Communicating an instruction to turn off a component of the heating of cooling system includes transmitting the control signal from the central processing unit to the transmitter, and transmitting at least a portion of the control signal from the transmitter to a receiver of the thermostat.

In some embodiments, the central processing unit is further programmed or configured to instruct the display to present an inquiry message and receive, from at least one of the display and a control button, a response to the inquiry message. The instruction to turn off a component of the heating or cooling system is based at least partially on the response to the inquiry message.

In some embodiments, the at least one sensor includes a temperature sensor, the parameter measured by the at least one sensor is an air temperature, and the display is configured to present a value of the air temperature as measured by the at least one sensor.

In some embodiments, the display includes a backlight and the central processing unit is further programmed or configured to instruct the backlight to be illuminated based at least partially on the determination that one or more of the parameters measured by the at least one sensor is outside of the predefined safe zone.

In some embodiments, the detection and control device further includes a transmitter in communication with the central processing unit and configured to communicate with a mobile device. The detection and control device further includes a receiver in communication with the central processing unit and configured to communicate with the mobile device. The central processing unit is further programmed or configured to instruct the transmitter to transmit an inquiry message to the mobile device and receive, from the receiver via the mobile device, a response to the inquiry message. The instruction to turn off a component of the heating or cooling system is based at least partially on the response to the inquiry message.

In some embodiments, the housing is releasably attached to a vent cover configured for attachment to the supply vent.

In some embodiments, at least one of the sensors is a probe insertable into the supply vent.

In some embodiments, at least one of the sensors is contained in the housing.

Other embodiments of the present disclosure are directed to a detection and control device for a supply vent of a heating or cooling system. The device includes a housing attachable to the supply vent of the heating or cooling system, a display configured to present a message to a user, at least one sensor configured to measure at least one parameter, and a central processing unit. The central processing unit is programmed or configured to receive an input from the at least one sensor, determine based on the input received from the at least one sensor if one or more of the parameters measured by the at least one sensor is within a predefined safe zone, and generate and communicate a suggested course of action to a user based at least partially on a determination that one or more of the parameters measured by the at least one sensor is outside of the predefined safe zone.

In some embodiments, the central processing unit is further programmed or configured to determine via an input received from the user whether the suggested course of action has been completed, determine for a second time if one or more of the parameters measured by the at least one sensor is within a predefined safe zone based on the input received from the at least one sensor, and generate and communicate a subsequent suggested course of action to the user based at least partially on the second determination that one or more of the parameters measured by the at least one sensor is outside of the predefined safe zone.

In some embodiments, determining whether the suggested course of action has been completed includes receiving, from at least one of the display and a control button, a response to the suggested course of action.

In some embodiments, communicating a suggested course of action includes instructing the display to present a suggestion message.

In some embodiments, the detection and control device further includes a transmitter in communication with the central processing unit and configured to communicate with a mobile device. The detection and control device further includes a receiver in communication with the central processing unit and configured to communicate with the mobile device. Communicating a suggested course of action includes instructing the transmitter to transmit a suggestion message to the mobile device. The central processing unit is further programmed or configured to receive, from receiver via the mobile device, a response to the suggestion message and determine, based at least partially on the response to the suggested course of action, whether the suggested course of action has been completed.

In some embodiments, the housing is releasably attached to a vent cover configured for attachment to the supply vent.

Other embodiments of the present disclosure are directed to a computer-implemented method for controlling a heating or cooling system. The method includes attaching a detection and control device to a vent cover of a supply vent of the heating or cooling system. The detection and control device includes at least one sensor communicating with a central processing unit. The method further includes measuring, via the at least one sensor of the device, at least one parameter and communicating the measured parameter to the central processing unit as an input. The method further includes determining, via the central processing unit of the detection and control device, if one or more of the parameters measured by the at least one sensor is within a predefined safe zone. The method further includes generating and communicating, via the central processing unit of the detection and control device, a suggested course of action to a user based at least partially on a determination that one or more of the parameters measured by the at least one sensor is outside of the predefined safe zone.

In some embodiments, the method further includes determining, via an input received from the user, whether the suggested course of action has been completed and determining, for a second time, if one or more of the parameters measured by the at least one sensor is within a predefined safe zone based on the input received from the at least one sensor. The method further includes generating and communicating, via the central processing unit of the detection and control device, a subsequent suggested course of action to the user based at least partially on the second determination that one or more of the parameters measured by the at least one sensor is outside of the predefined safe zone.

In some embodiments, communicating a suggested course of action includes presenting, via the central processing unit of the detection and control device, a suggestion message on a display of the detection and control device.

In some embodiments, determining whether the suggested course of action has been completed includes receiving, from at least one of a mobile device and the detection and control device, a response to the suggested course of action.

These and other features and characteristics of detection and control device for an HVAC supply vents, as well as use of the same will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and claims, the singular forms of "a", "an", and "the" include plural referents unless the context clearly dictates otherwise.

DETAILED DESCRIPTION OF THE INVENTION

Figure 2:
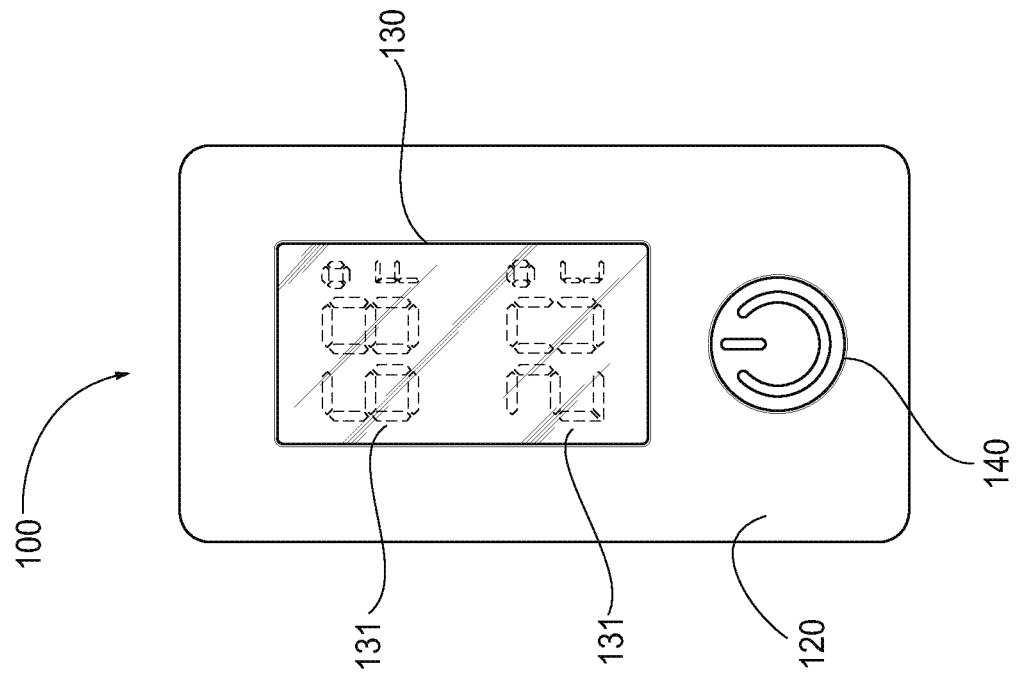
FIG. 2 is a front view of the device of FIG. 1.

For purposes of the description hereinafter, the terms "upper", "lower", "right", "left", "vertical", "horizontal", "top", "bottom", "lateral", "longitudinal", and derivatives thereof shall relate to the disclosed apparatus as it is oriented in the figures. However, it is to be understood that the apparatus of the present disclosure may assume alternative variations and step sequences, except where expressly specified to the contrary. It is also to be understood that the specific systems and processes illustrated in the attached drawings and described in the following specification are simply exemplary examples of the apparatus disclosed herein. Hence, specific dimensions and other physical characteristics related to the examples disclosed herein are not to be considered as limiting.

As used herein, the term "HVAC" is an acronym for heating, ventilation, and air conditioning.

As used herein, the term "central heating and/or cooling unit" refers to a climate controlling apparatus which supplies heated or cooled air to a residential or commercial structure. Such apparatuses include furnaces, boilers, heat pumps, air conditioning units, and like devices.

As used herein, the terms "supply vent" and "register" may be used interchangeably to refer to an orifice or orifice cover through which climate-controlled air is supplied from a central heating and/or cooling unit.

As used herein, the terms "communication" and "communicate" refer to the receipt or transfer of one or more signals, messages, commands, or other types of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from the first unit and transmits processed data to the second unit. It will be appreciated that numerous other arrangements are possible.

As used herein, the terms "substantially" or "approximately", when used to relate a first numerical value or condition to a second numerical value or condition, means that the first numerical value or condition is within 10 units or within 10% of the second numerical value or condition, as the context dictates and unless explicitly indicated to the contrary. For example, the term "substantially parallel to" means within plus or minus 10° of parallel. Similarly, the term "substantially perpendicular to" means within plus or minus 10° of perpendicular. Similarly, the term "substantially equal to" means within 10% of being equal to.

As used herein, the terms "transverse", "transverse to", and "transversely to" a given direction mean not parallel to that given direction. Thus, the terms "transverse", "transverse to", and "transversely to" a given direction encompass directions perpendicular to, substantially perpendicular to, and otherwise not parallel to the given direction.

As used herein, the term "associated with", when used in reference to multiple features or structures, means that the multiple features or structures are in contact with, touching, directly connected to, indirectly connected to, adhered to, or integrally formed with one another.

Referring to the drawings in which like reference numerals refer to like parts throughout the several views thereof, the present disclosure is generally directed to a detection and control device for the use on or with an HVAC supply vent.

Figure 1:
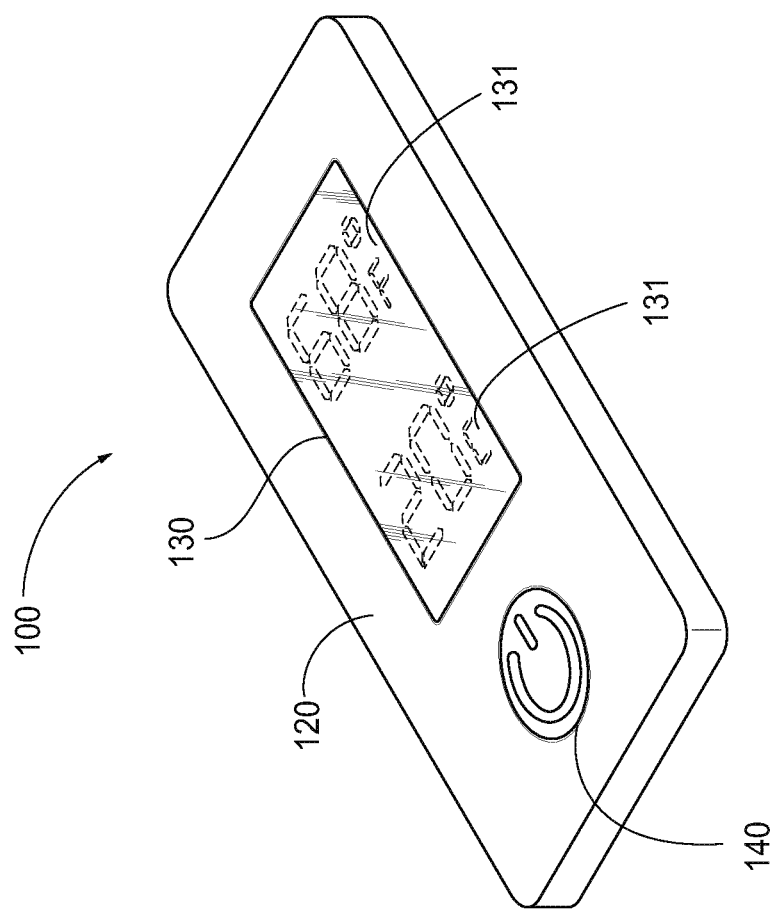
FIG. 1 is a perspective view of a detection and control device according to an embodiment of the present disclosure.

Referring now to FIGS. 1-2, a detection and control device 100 generally includes a housing 120, a display 130, and a control button 140. The housing 120 encloses the internal circuitry of the device 100, as will be described in greater detail below with reference to FIG. 7. The housing 120 includes cutouts through which the display 130 and the control button 140 are visible and accessible to a user.

The display 130 may be either a digital or analog screen for visually presenting to the user various parameters detected by the device 100, as well as other information such as troubleshooting messages and user input requests. In some embodiments the display 130 may be a touch screen capable of receiving feedback from the user. The display 130 may include a backlight which illuminates the display 130 for ease of viewing. Additionally, the backlight may illuminate the display 130 in conspicuous colors or patterns to alert the user of an operating condition or abnormality. The display 130 may be divided into subsections according to the information being presented. For example, the display shown in FIGS. 1 and 2 is divided into two subsections 131, respectively showing a measured temperature in degrees Fahrenheit and degrees Celsius. Any number of subsections 131 may be considered, and the number of subsections may dynamically change during use of the device 100 in order to more effectively present information to the user. The control button 140 may be a momentary switch for turning the display 130 on or off. Additionally, the control button 140 may be utilized to receive commands from the user in conjunction with information presented on the display 130. In some embodiments, the control button 140 may be a component of the display 130. For example, in embodiments in which the display 130 is a touchscreen, one of the subsections 131 may be designated as the control button 140. Further configurations and functionality of the display 130 and control button 140 will be described below with reference to FIG. 5.

Figure 3:
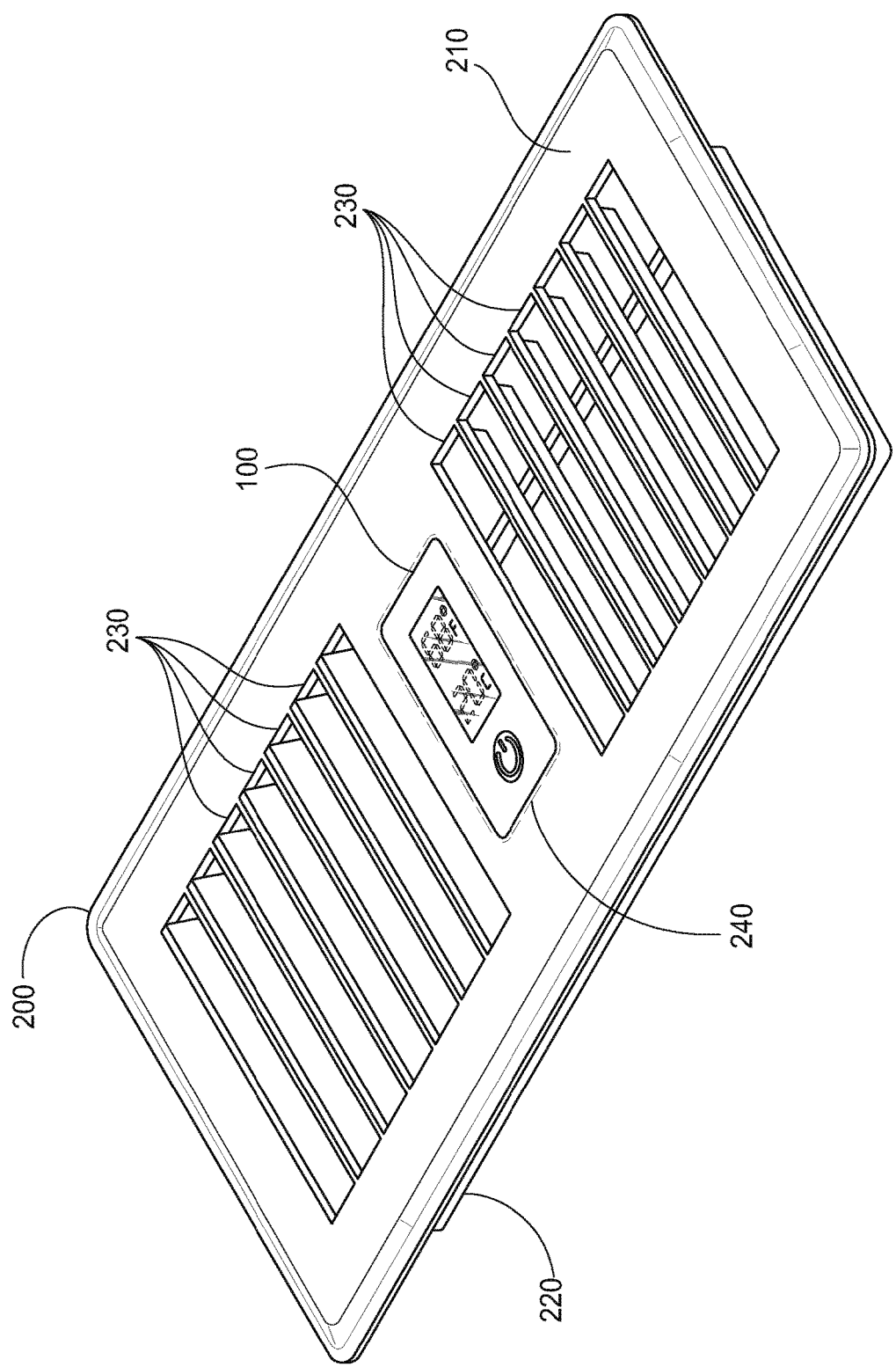
FIG. 3 is a perspective view of the device of FIG. 1 attached to a supply vent cover according to an embodiment of the present disclosure.
Figure 4:
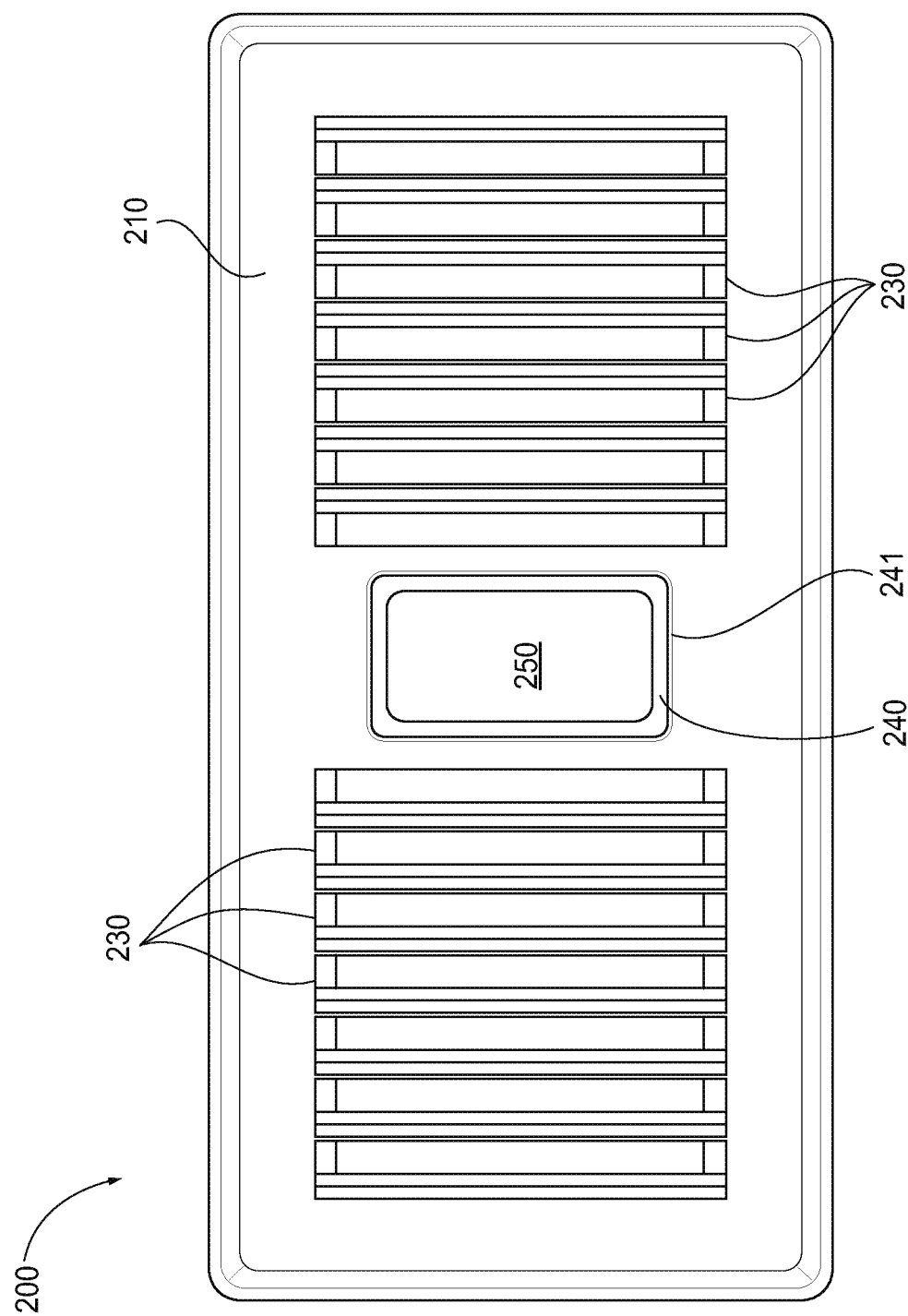
FIG. 4 is a front view of the supply vent cover of FIG. 3.

Referring now to FIGS. 3-4, the device 100 may be configured to attach to a vent cover 200 for an HVAC supply vent. The vent cover 200 includes a faceplate 210 and a flange 220 extending from the rear of the faceplate 210. The flange 220 is configured for insertion into the HVAC supply vent and retains the vent cover 200 in position over the HVAC supply vent. The faceplate 210 may define one or more louvers 230 or other cutouts to allow air to flow through the faceplate 210 from the HVAC supply vent. The louvers 230 may be fixed or moveable to allow the user to control the amount air passing through the faceplate from the HVAC supply vent. The faceplate 210 may include a mounting recess 240 for attachment of the device 100 to the vent cover 200. The mounting recess 240 may define a cutout 250 such that the rear side of the device 100 is exposed when the device 100 is connected to the vent cover 200. The mounting recess 240 may be offset from the plane of the face plate 210 such that the device 100 sits nested in or flush with the plane of the faceplate 210. A lip 241 may project inwardly from one or more edges of the mounting recess 240 to retain the device 100 within the mounting recess 240. The housing 120 of the device 100 may be configured to interact with the lip 241 of the mounting recess 240 in a snap-fit manner to facilitate repeated connection and disconnection of the device 100 from the vent cover 200. Other mechanisms for connecting the device 100 to the vent cover 200 may be understood by those skilled in the art and are considered within the scope of the present disclosure. For example, one of the device 100 and the vent cover 200 may include a magnet to attach to the other of the device 100 and the vent cover 200. In other examples, one of the device 100 and the vent cover 200 may include deflectable tabs for engaging a corresponding structure of the other of the device 100 and the vent cover 200. In other examples, the device 100 may be secured to the vent cover 200 with fasteners such as screws or rivets. In still other examples, the device 100 may be integrally formed with the vent cover 200.

Figure 5:
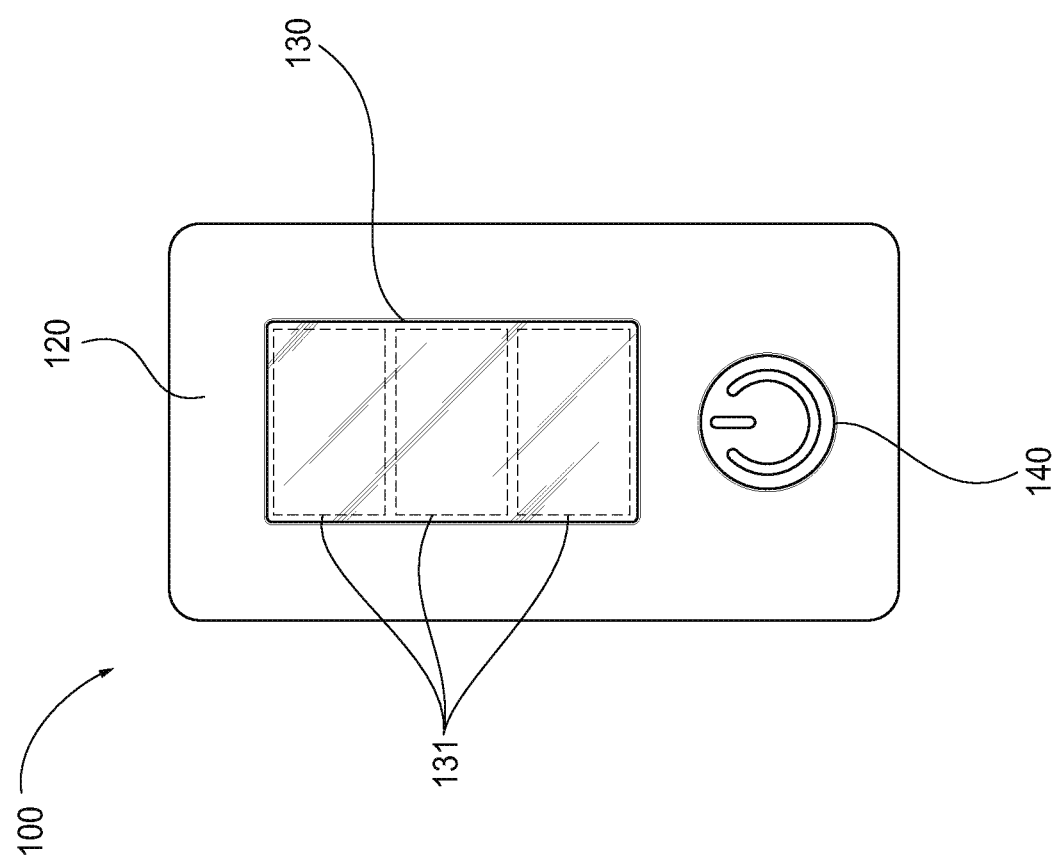
FIG. 5 is a front view of the device of FIG. 1.

Referring now to FIG. 5, each subsection 131 of the display 130 may be designated to perform one or more functions of the device 100. In some embodiments, the function designated for each of the subsections 131 may be to present information to the user. As was previously described in reference to FIGS. 1 and 2, for example, any of the subsections 131 of the display 130 may present a temperature measured by a probe or sensor of the device 100. Other subsections 131 may present messages to the user based on the parameters measured or detected by a probe or sensor of the device 100. For example, if the temperature measured at the supply vent exceeds a predetermined threshold value, a subsection 131 of the display 130 may present a message warning the user that the central heating unit is likely malfunctioning. Other subsections 131 may present messages recommending or instructing the user to perform an action. For example, one subsection 131 may present a message recommending that the user replace the furnace filter. In other examples, one subsection 131 may direct the user to press to control button 140 to cause the device 100 to perform an action. For example, one subsection may instruct the user to press the control button 140 to shut off the furnace. The designated function of the subsections 131 may dynamically change during use of the device 100. For example, one subsection 131 may, in a default condition, present a measured temperature. However, if the measured temperature exceeds a predetermined threshold value, that subsection 131 may display a warning message indicating that the central heating unit is likely malfunctioning. Concurrently, another subsection 131, upon the measured temperature exceeding the threshold value, may present instructions recommending the user change the furnace filter. The examples presented above are used to illustrate the basic capabilities of the display 130, and such examples are not to be construed as limiting the design or functionality of the display 130. A more detailed explanation of the functionality of the display 130, in conjunction with the other features of the device 100 and a heating or cooling system, is provided below with reference to FIGS. 6 and 8-10.

Figure 6:
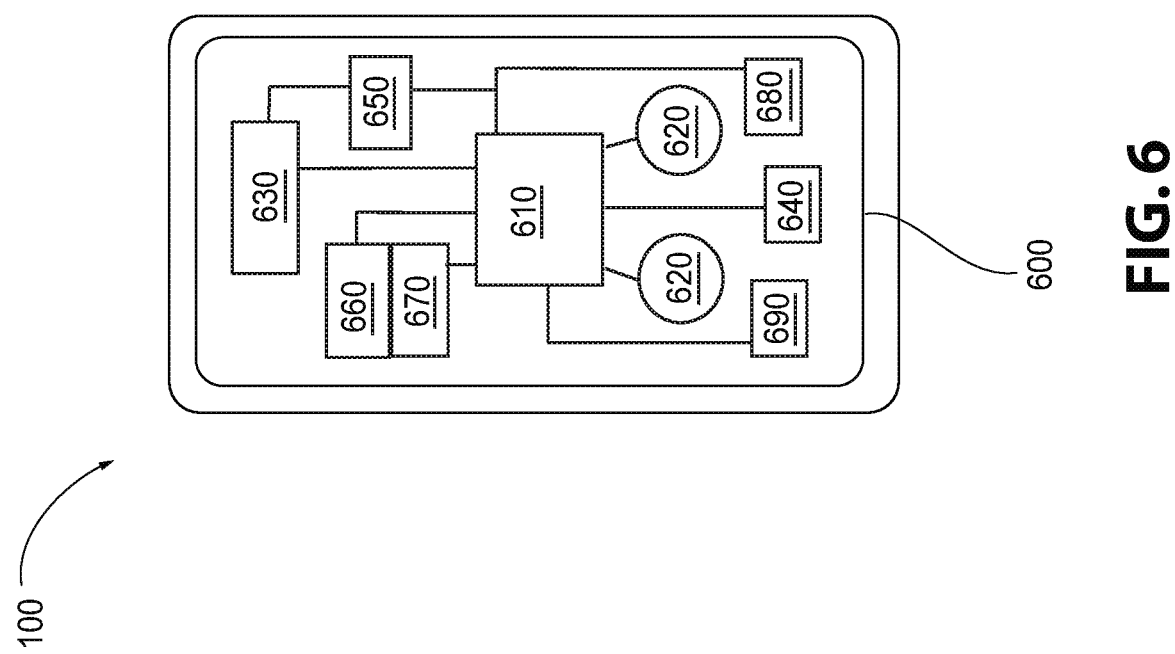
FIG. 6 is a schematic of the circuitry of the device of FIG. 1.

Referring now to FIG. 6, the device 100 includes a control circuit 600 that allows the various components of the device 100 to communicate with one another and, in some embodiments, to communicate with external devices such as a central heating and/or cooling unit, a thermostat, a mobile device, and a computer. The control circuit 600 includes a central processing unit (CPU) 610 that carries out instructions of a computer program, including reading inputs received by the control circuit 600 and generating output. At least one sensor 620 provides an input to the CPU 610 in the form of a measured parameter. Each of the at least one sensors 620 may be, for example, a thermometer or other temperature measuring apparatus, a carbon monoxide (CO) detector, an air flow meter, an accelerometer, a motion detector, and/or a touch sensor. Each of the at least one sensors 620 may be integral with the device 100 and contained within the housing 120. Alternatively, each of the at least one sensors 620 may be an external probe connectable to the control circuit 600 via a bus or connector accessible on the housing 120 of the device 100.

The control circuit 600 further includes a display controller 630 associated with the display 130. The display controller 630 delivers instructions from the CPU 610 to the display 130 and, in some embodiments, sends user inputs received from the display 130 to the CPU 610. Similarly, a button controller 640 associated with the control button 140 sends user inputs received from the control button 140 to the CPU 610.

The control circuit 600 further includes a power source 650 which supplies electrical power to the CPU 610 and other power-consuming components of the control circuit 600. The power source 650 may be, in some embodiments, a replaceable or rechargeable battery. In other embodiments, the power source 650 may be a low voltage wire receiving power from the transformer or other circuitry of a central heating and/or cooling unit. The power source 650 may also be a low voltage wire supplemented with a battery backup.

The control circuit 600 may further include a transmitter 660 and/or receiver 670 for communicating with an external electronic device. The transmitter 660 allows the CPU 610 to send instructions, data, or other information to the external electronic device, while the receiver 670 allows the CPU 610 to receive instructions, data, or other information from the external electronic device. The transmitter 660 and the receiver 670 may be a single component or separate components. The transmitter 660 and/or the receiver 670 may be capable of communicating via a wired or wireless connection utilizing various networks and/or communication connections. For example, a network over which the transmitter 660 and/or the receiver 670 may communicate may be a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks. A communication connection over which the transmitter 660 and/or the receiver 670 may communicate may be a near-field (NFC) communication connection, a Satellite communication connection, an RFID communication connection, a Bluetooth® communication connection, a Zigbee® communication connection, and/or the like, and/or a combination of these or other types of communication connections. All components described herein as being in communication with the transmitter 660 and/or the receiver 670 may be capable of communicating via a wired or wireless connection utilizing various networks and/or communication connections described above.

In some embodiments, the control circuit 600 further includes a wiring terminal 680 configured for connection to the low voltage circuitry of a central heating and/or cooling unit. The wiring terminal 680 may include connections for standard thermostat wire configurations, including, for example, a common wire, a compressor wire, a fan wire, a heat pump wire, one or two heat wires, and/or a common wire. The wiring terminal 680 facilitates direct communication between the control circuit 600 and the central heating and/or cooling unit, allowing the control unit 600 to control the central heating and/or cooling unit in place of or in conjunction with a thermostat. The wiring terminal 680 may alternatively be substituted for a wiring harness for connection to the low voltage circuitry of a central heating and/or cooling unit.

The control circuit 600 may further include a computer readable storage medium 690 on which programming instructions of the CPU 610 may be stored and data gathered by the sensors 620a, 620b may be stored in a log.

Figure 7:
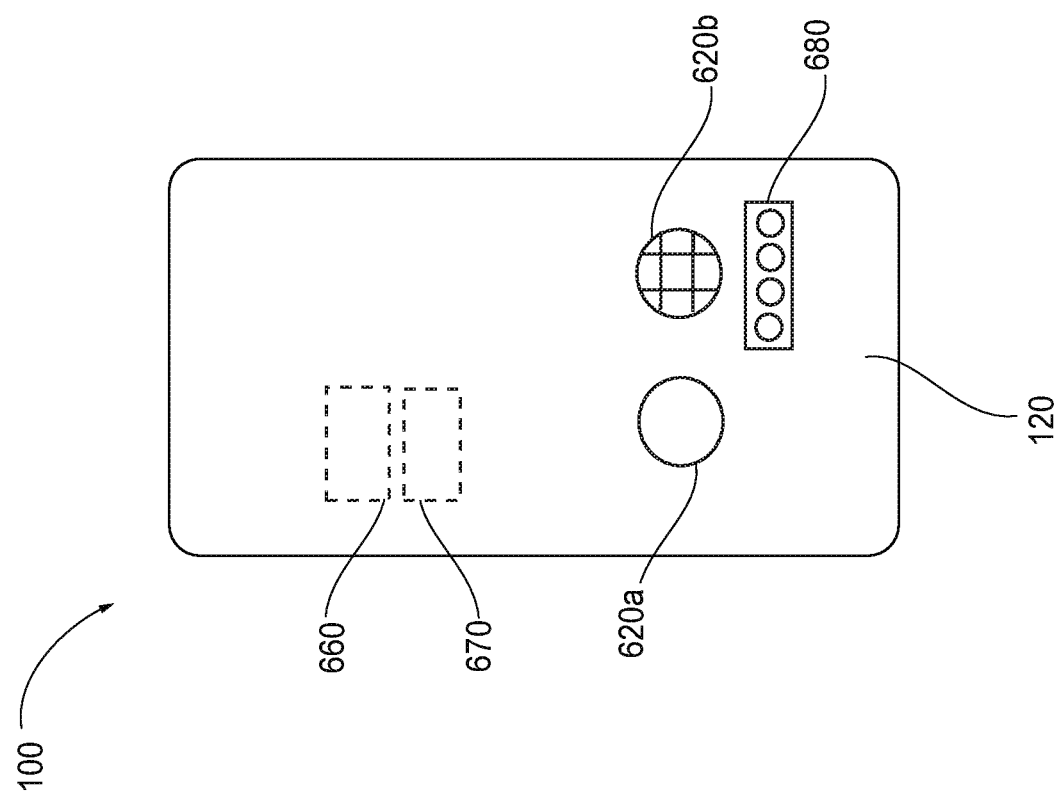
FIG. 7 is rear view of the device of FIG. 1.

FIG. 7 illustrates a rear view of the device 100 according to an embodiment of the disclosure having two sensors 620, namely a temperature sensor 620a and a carbon monoxide (CO) detector 620b. The temperature sensor 620a and a carbon monoxide detector 620b are exposed through corresponding apertures in the housing 120 to measure parameters of the air flowing from the HVAC supply vent to which the device 100 is associated. The wiring terminal 680 is similarly accessible via an aperture in the housing 120 to facilitate connection of the device 100 to the central heating and/or cooling unit. The device 100 further includes the transmitter 660 and the receiver 670 contained within the housing 120, as exposure to the ambient air and accessibility of these components is not required.

Figure 8:
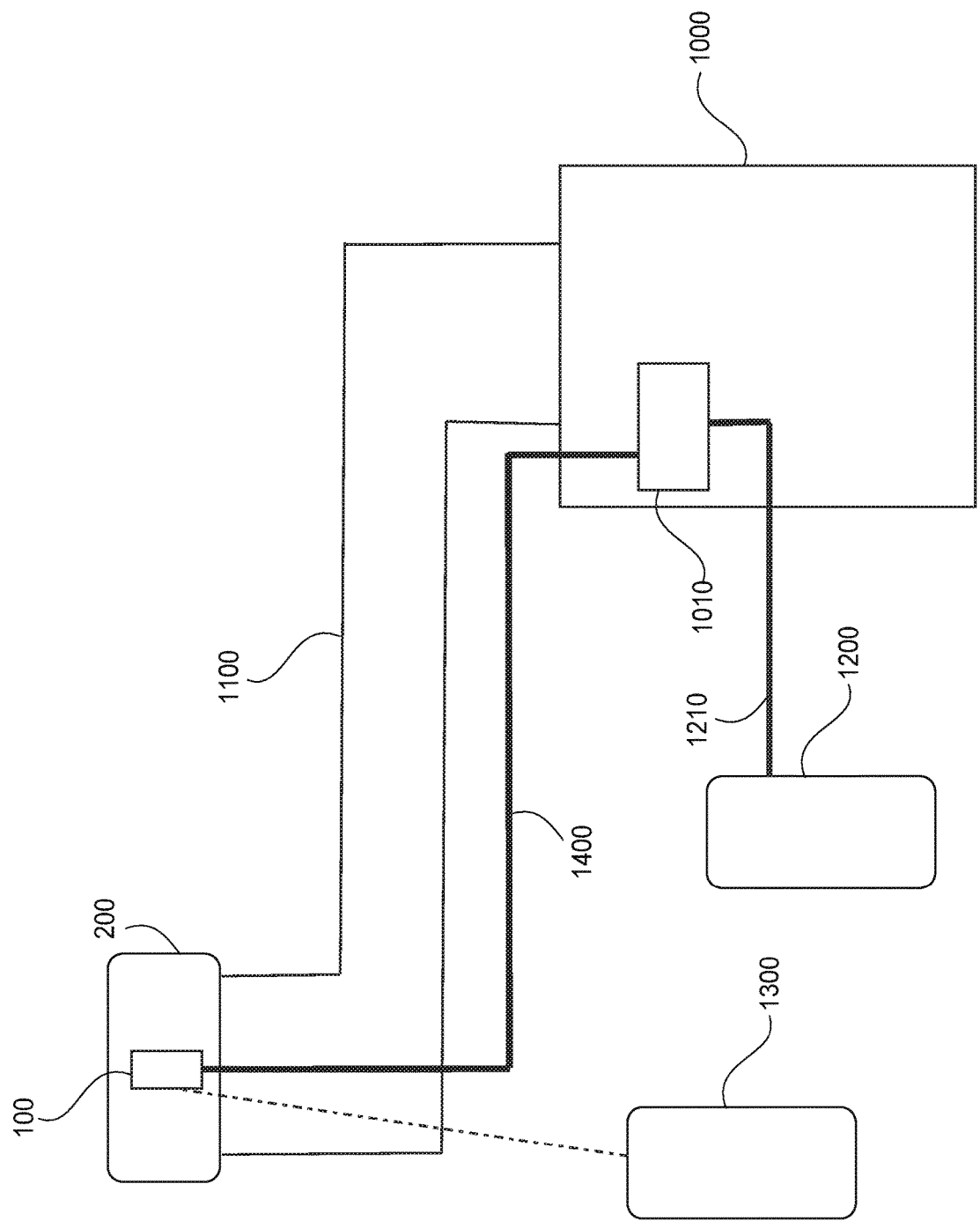
FIG. 8 is a schematic of a heating and cooling system utilizing the device of FIG. 1.

Referring now to FIG. 8, the device 100 of FIG. 7 is shown in use in a heating and cooling system including a central heating and/or cooling unit 1000. The central heating and/or cooling unit 1000 includes a gas or electric furnace and an air conditioning unit that supply heated air and cooled air, respectively, to a duct 1100. The duct 1100 terminates in an HVAC supply vent into which the vent cover 200 is inserted. The device 100 is attached to the vent cover 200 in the manner described above with reference to FIGS. 3 and 4. The system further includes a thermostat 1200 connected to low voltage circuit 1010 of the central heating and/or cooling unit 1000. The system further includes a mobile device 1300, such as a smartphone, having an application to facilitate wireless communication with the device 100 as indicated by the dot-dash-dot line in the drawing. The device 100 is connected to and in communication with the low voltage circuit 1010 of the central heating and/or cooling unit 1000 via a wiring harness 1400 connected to the wiring terminal 680 (not shown). The thermostat 1200 is likewise connected to the low voltage circuit 1010 of the central heating and/or cooling unit 1000 via wiring 1210 according to customary installation practice. Connection of the both the thermostat 1200 and the device 100 with the central heating and/or cooling unit 1000 allows either or both of the device 100 and the thermostat 1200 to control the central heating and/or cooling unit 1000. Thus, if the central heating and/or cooling unit 1000 becomes stuck in an "on" state due to a failed relay in the thermostat 1200 or a short in the thermostat wiring 1210, the device 100 may be utilized to turn off the central heating and/or cooling unit 1000.

Figure 9:
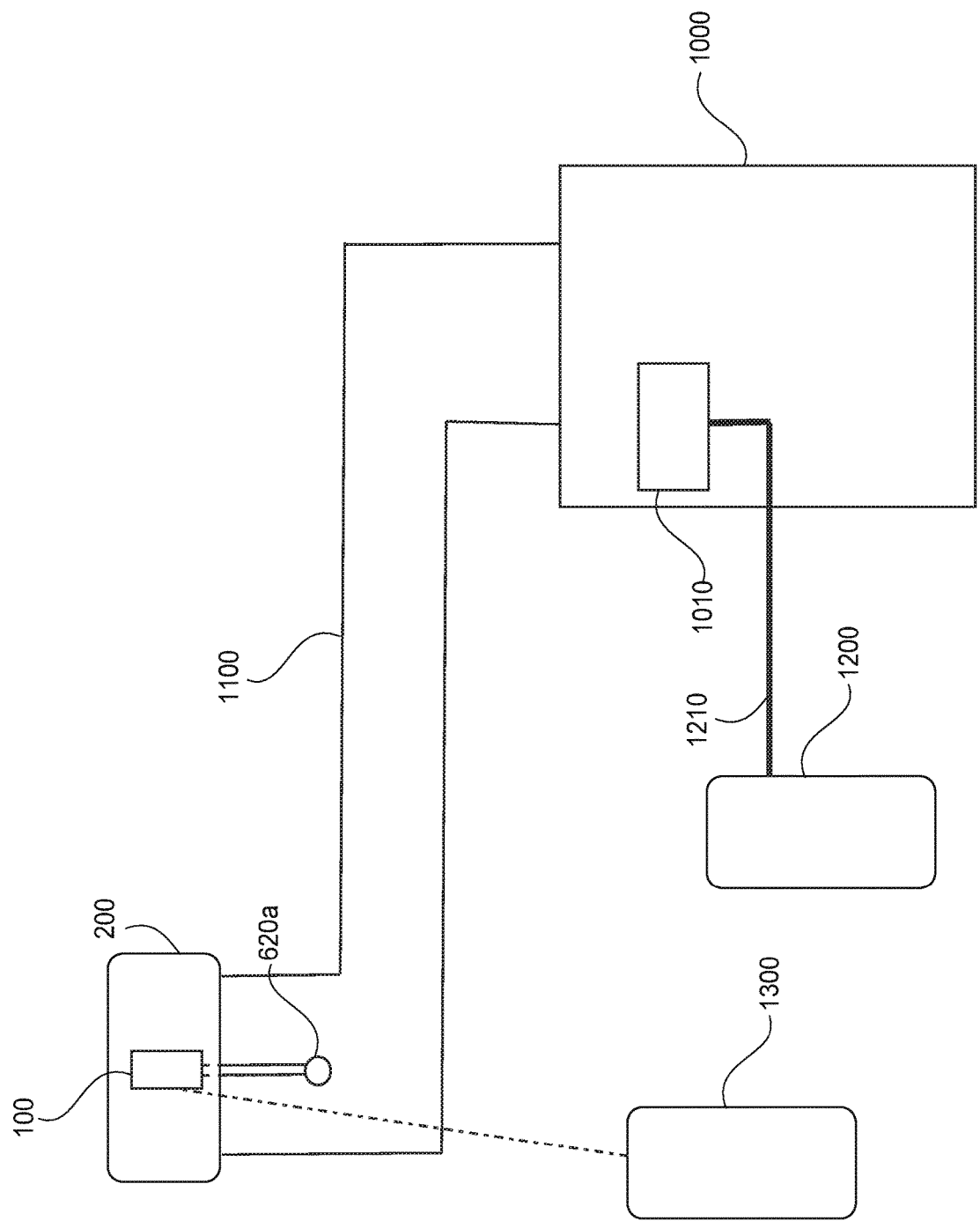
FIG. 9 is a schematic of a heating and cooling system utilizing the device of FIG. 1.

Referring now to FIG. 9, another embodiment of the device 100 is shown in another heating and cooling system. The heating and cooling system includes the central heating and/or cooling unit 1000, the duct 1100, the thermostat 1200, and the mobile device 1300. As with the embodiment of FIG. 8, the thermostat 1200 is connected to and in communication with the low voltage circuit 1010 of the central heating and/or cooling unit 1000. Unlike the embodiment of FIG. 8, the device 100 is not connected directly to the central heating and/or cooling unit 1000, for example, by the wiring harness 1400 of FIG. 8. As no wiring harness connects the device 100 to other components in the system, the device 100 may be easily and readily removed from the system. Thus the device 100 in this configuration may be used as a portable diagnostic tool and may be moved to other ducts (not shown) in the system to locate and isolate problems. An additional difference from the embodiment of FIG. 8 is that the temperature sensor 620a is located on a probe outside the housing 120 such that the temperature sensor 620a may be inserted further into the duct 1100.

Figure 10:
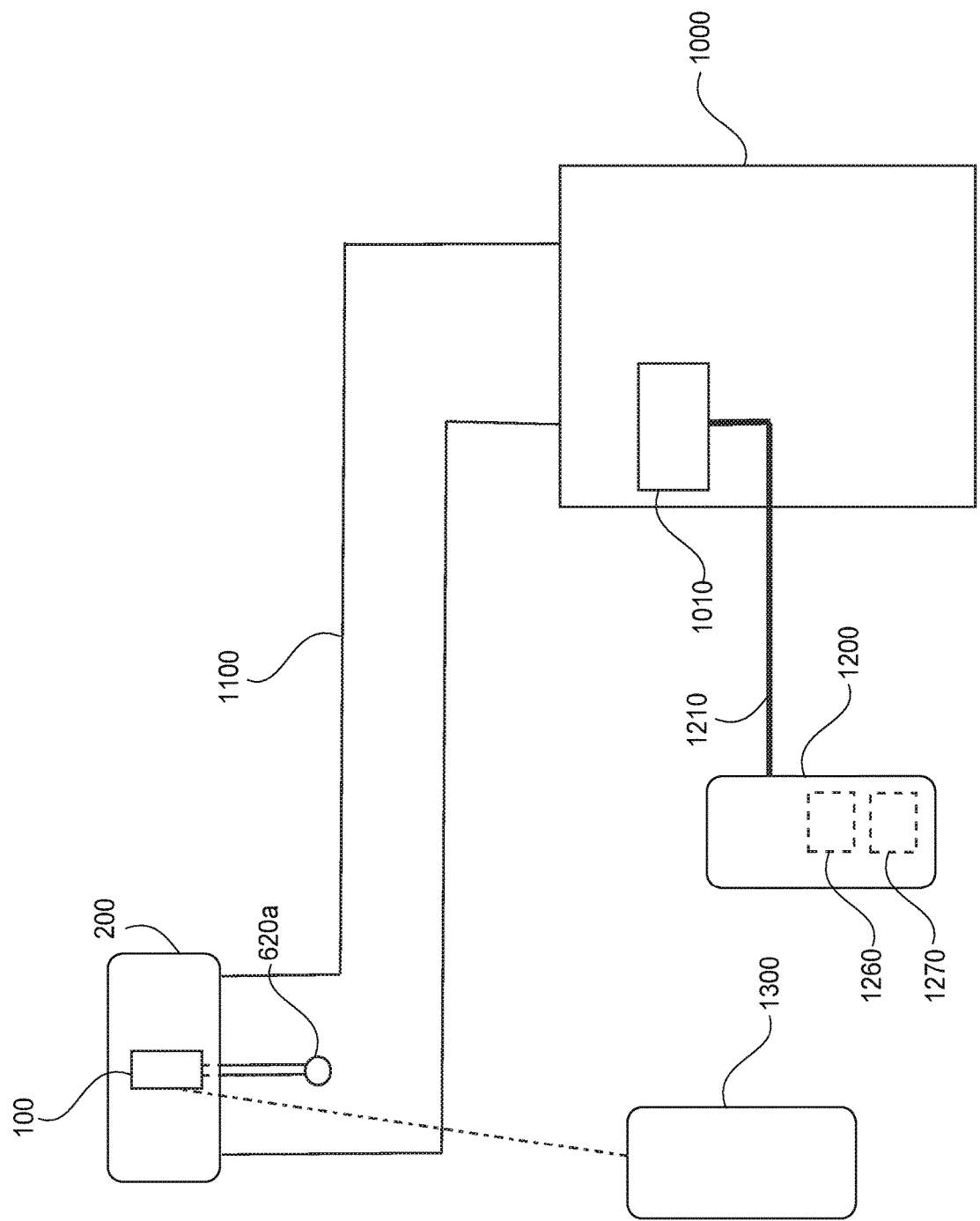
FIG. 10 is a schematic of a heating and cooling system utilizing the device of FIG. 1.

FIG. 10 illustrates yet another embodiment of the heating and cooling system including the device 100. The embodiment of FIG. 10 is substantially similar to the embodiment of FIG. 9, except that the thermostat 1200 includes a transmitter 1260 and receiver 1270 capable of communicating with the transmitter 660 and the receiver 670 of the device 100. Thus, the transmitter 660 of the device 100 may send a signal to the receiver of the thermostat 1200 instructing the thermostat 1200 to turn the central heating and/or cooling unit 1000 on or off, control a fan, or perform another control function of the central heating and/or cooling unit 1000.

With continued reference to FIGS. 8-10, the control circuit 600 of the device 100 may be configured to operate differently based on the particular embodiment of the heating and cooling system. In general the temperature sensor 620a and the CO detector 620b perform measurement of the temperature and CO concentration, respectively, of air exiting the duct 1100. The frequency at which such measurements are taken is programmed into the CPU 610, which receives a data input from the temperature sensor 620a and the CO detector 620b at the predetermined frequency. The CPU 610 may then generate a data output and transmit the data output to the display controller 630, which instruct the display 130 to present information to the user. For example, the display 130 may present, in one subsection 131, the numerical value of the temperature as measured by the temperature sensor 620a.

The CPU 610 also analyzes the data signals received from the sensors 620a, 620b to determine whether the value of the measured parameters is within a predefined safe zone. The predefined safe zone may be, for example, a range outside which the measured parameter may have adverse effects on the user's health, or a range outside which components of the central heating and/or cooling unit 1000 may be expected to fail. Alternatively, the predefined safe zone may include several tiered zones of increasing risk to the user's health or of increasing likelihood of component failure. For example, if the measured parameter is CO concentration, the predefined safe zone may include a first safe tier including values of less than 25 parts per million (ppm), a second caution tier including values of greater than 25 ppm but less than 70 ppm, and a third unsafe tier including values over 70 ppm.

If the measured parameter falls outside the predefined safe zone, the CPU 610 may be programmed or configured to perform control action to attempt to rectify the unsafe parameter. For example, the CPU 610 may determine whether the CO concentration, as measured by the CO detector 620*b*, exceeds a predefined safe value of 70 ppm. If the CO concentration exceeds the predefined safe value, the CPU 610 may generate an instruction to the display controller 630 causing the backlight of the display 130 to illuminate in red. In addition, the instruction generated by the CPU 610 may cause the display controller 630 to present a warning message, such as "UNSAFE CO LEVELS", on the display 130. In some embodiments, such as the embodiments of FIG. 8 or 10, the CPU 610 may further generate an instruction to shut off the heating and/or cooling unit 1000 if the predefined safe value is exceeded for a predetermined period of time. In the embodiment of FIG. 8, the CPU 610 may generate an instruction to shut off the heating and/or cooling unit 1000 via the wiring terminal 680. In particular, the instruction may transmit a control signal from the CPU 610 to the low voltage circuit 1010 of the heating and/or cooling unit 1000. In the embodiment of FIG. 10, the CPU 610 may generate and communicate an instruction to shut off the heating and/or cooling unit 1000 by transmitting a control signal from the CPU 610 to the transmitter 660. The transmitter 660 may then parse the control signal and transmit at least a portion of the control signal to the receiver 1270 of the thermostat 1200. The portion of the control signal communicated to the thermostat 1200 may cause the thermostat 1200, via its own circuitry, to turn off the heating and/or cooling unit 1000 via the low voltage circuit 1010.

In other embodiments, the CPU 610 may be programmed or configured to turn off the heating and/or cooling unit 1000 based on a response to an inquiry presented to the user. If the predetermined safe value is exceeded, as measured by the CO detector, the CPU 610 may generate an inquiry message to present on the display 130. For example, the CPU 610 may instruct the display controller 630 to present the message "UNSAFE CO LEVEL—PRESS BUTTON TO SHUT OFF FURNACE" on the display 130. If the user subsequently presses the control button 140, the CPU 610 generates an instruction to shut off the heating and/or cooling unit 1000 via the wiring terminal 680 or the transmitter 660, substantially as described above. In other embodiments, the CPU 610 may instruct the transmitter 660 to send the inquiry message, such as "UNSAFE CO LEVEL—REPLY 'S' TO SHUT OFF FURNACE", to the mobile device 1300. The receiver 670 may then receive a response message from the mobile device 1300, and the CPU 610 may determine whether to shut off the heating and/or cooling unit 1000 based on the response message received.

In still other embodiments, the CPU 610 may be programmed or configured to assist the user in diagnosing problems with the heating and cooling system. More particularly, if a predetermined safe value is exceeded the CPU 610 may be programmed or configured to present a suggested course of action from a library of suggested courses of action stored on the computer readable storage medium 690. For example, if the temperature in the duct 1100, as measured by the temperature sensor 620*a*, exceeds a predetermined safe value of 140° F., the CPU 610 may instruct the display controller 630 to present a suggestion message, such as "OVERHEATING—CHANGE FILTER—PRESS BUTTON WHEN COMPLETE", on the display 130. Once the user presses the control button 140, indicating that the filter has been changed, the CPU 610 instructs the display controller 630 to remove the suggestion message, and the CPU 610 generates an entry in the storage medium 690 indicating that the suggested course of action has been performed. After a predetermined period of time, the CPU 610 again analyzes the temperature sensor 620*a* measurement to determine if the suggested course of action was successful in reducing the measurement below the predefined safe value. If the measured parameter still exceeds the predefined safe value, the CPU 610 may generate a second suggested course of action and instruct the display controller 630 to present a second suggestion message. This process of generating suggested courses of action and receiving input and/or confirmation from the user may be repeated until the CPU 610 exhausts the library of suggested courses of action stored on the storage medium 690, or until the measured parameter falls below the predefined safe value. If the library of suggested courses of actions is exhausted, the CPU 610 may instruct the display controller 630 to present a final suggestion message, such as "STILL OVERHEATING—CONTACT SERVICE TECH", on the display 130. The order in which the suggested courses of action are presented to the user may be based on a predetermined algorithm, such as in descending order of likely effectiveness, or the order may be based at least partially on inputs received from the user and/or the sensors 620. As discussed in connection with the other examples above, the CPU 610 may be configured to present the suggested courses of action to the user and receive responses from the user via the transmitter 660 and the receiver 670 communicating with the mobile device 1300, rather than or in addition to presenting the suggested courses of action and receive responses via the display 130 and control button 140.

In another example, if the temperature in the duct 1100, as measured by the temperature sensor 620*a*, falls below a predetermined safe value of 45° F., the CPU 610 may instruct the display controller 630 to present a suggestion message, such as "AIR CONDITIONER STUCK ON—CONTACT SERVICE TECH", on the display 130.

In some embodiments, the CPU 610 may be programmed or configured to turn off or hibernate the display 130 when the display 130 is not in use to conserve power. More particularly, the CPU 610 may be programmed or configured to automatically turn off or hibernate the display 130 after the display 130 has been turned on or awake for a predetermined period of time. One of the sensors 620 of the device 100 may be a motion sensor which turns on or wakens the display 130 when the sensor 620 detects movement of the user in the proximity of the device 100. Alternatively, one of the sensors 620 of the device 100 may be a touch sensor which turns on or wakens the display 130 when the sensor 620 detects pressure, such as a tap from the user's hand or foot on the device 100. In some embodiments, the CPU 610 may be programmed or configured to override the automatic turn off or hibernate function if a predefined safety value is exceeded. Thus, illumination of the display 130 may draw the user's attention to the display 130, which may be presenting a message to the user as described in several of the embodiments discussed above.

As may be appreciated from the FIGS. 8-10, various embodiments of the heating and cooling system may be implemented, including various combinations and permutations of the shown embodiments. As such, the device 100 may be utilized in a variety of different systems to perform a variety of different functions. In the embodiment of FIG. 8, the device 100 is wired directly to the heating and/or cooling device 1000. As such this embodiment is particularly suited for a permanent installation in which the device 100 is not moved from the HVAC supply vent. In contrast, the device 100 in the embodiments of FIGS. 9 and 10 is not wired to the heating and/or cooling device 1000 and is therefore more readily detachable and movable from the HVAC supply vent. Accordingly, these embodiments are particularly well suited for monitoring multiple HVAC supply vents by moving the device 100 between the multiple HVAC supply vents. Additionally, these embodiments of the device 100 may be used as diagnostic tools by HVAC installers and repairmen to detect and isolate problems with HVAC systems.

While several examples of a detection and control device for HVAC supply vents, as well as methods for using the same, are shown in the accompanying figures and described in detail hereinabove, other examples will be apparent to and readily made by those skilled in the art without departing from the scope and spirit of the present disclosure. For example, it is to be understood that aspects of the various embodiments described hereinabove may be combined with aspects of other embodiments while still falling within the scope of the present disclosure. Accordingly, the foregoing description is intended to be illustrative rather than restrictive. The assembly of the present disclosure described hereinabove is defined by the appended claims, and all changes to the disclosed assembly that fall within the meaning and range of equivalency of the claims are to be embraced within their scope.

What is claimed is:

1. A detection and control device for a supply vent of a heating or cooling system, the device comprising:
   a vent cover having one or more cutouts for airflow, the vent cover attachable to the supply vent of the heating or cooling system;
   a housing attached to the vent cover;
   a display configured to present a message to a user;
   at least one sensor configured to measure at least one parameter in the supply vent;
   a central processing unit programmed or configured to:
      receive an input from the at least one sensor;
      determine, based on the input received from the at least one sensor, if one or more of the parameters measured by the at least one sensor is within a predefined safe zone;
      generate and communicate a suggested course of action to a user based at least partially on a determination that one or more of the parameters measured by the at least one sensor is outside of the predefined safe zone;
      determine, via an input received from the user, whether the suggested course of action has been completed;
      determine, for a second time, if one or more of the parameters measured by the at least one sensor is within a predefined safe zone based on the input received from the at least one sensor; and
      generate and communicate a subsequent suggested course of action to the user based at least partially on the second determination that one or more of the parameters measured by the at least one sensor is outside of the predefined safe zone.

2. The detection and control device of claim 1, wherein determining whether the suggested course of action has been completed comprises receiving, from at least one of the display and a control button, a response to the suggested course of action.

3. The detection and control device of claim 1, wherein communicating a suggested course of action comprises instructing the display to present a suggestion message.

4. A detection and control device for a supply vent of a heating or cooling system, the device comprising:
   a vent cover having one or more cutouts for airflow, the vent cover attachable to the supply vent of the heating or cooling system;
   a housing attached to the vent cover;
   a display configured to present a message to a user;
   at least one sensor configured to measure at least one parameter in the supply vent;
   a central processing unit programmed or configured to:
      receive an input from the at least one sensor;
      determine, based on the input received from the at least one sensor, if one or more of the parameters measured by the at least one sensor is within a predefined safe zone; and
      generate and communicate a suggested course of action to a user based at least partially on a determination that one or more of the parameters measured by the at least one sensor is outside of the predefined safe zone;
   a transmitter in communication with the central processing unit, the transmitter configured to communicate with a mobile device; and
   a receiver in communication with the central processing unit, the receiver configured to communicate with the mobile device;
   wherein communicating a suggested course of action comprises instructing the transmitter to transmit a suggestion message to the mobile device; and
   wherein the central processing unit is further programmed or configured to:
      receive, from receiver via the mobile device, a response to the suggestion message; and
      determine, based at least partially on the response to the suggested course of action, whether the suggested course of action has been completed.

5. A computer-implemented method for controlling a heating or cooling system, the method comprising:
   attaching a detection and control device including a vent cover having one or more cutouts for airflow to a supply vent of the heating or cooling system, the detection and control device comprising at least one sensor communicating with a central processing unit;
   measuring, via the at least one sensor of the device, at least one parameter in the supply vent;
   communicating the measured parameter to the central processing unit as an input;
   determining, via the central processing unit of the detection and control device, if one or more of the parameters measured by the at least one sensor is within a predefined safe zone;
   generating and communicating, via the central processing unit of the detection and control device, a suggested course of action to a user based at least partially on a determination that one or more of the parameters measured by the at least one sensor is outside of the predefined safe zone;
   determining, via an input received from the user, whether the suggested course of action has been completed;

determining, for a second time, if one or more of the parameters measured by the at least one sensor is within a predefined safe zone based on the input received from the at least one sensor; and generating and communicating, via the central processing unit of the detection and control device, a subsequent suggested course of action to the user based at least partially on the second determination that one or more of the parameters measured by the at least one sensor is outside of the predefined safe zone.

6. The computer implemented method of claim 5, wherein communicating a suggested course of action comprises presenting, via the central processing unit of the detection and control device, a suggestion message on a display of the detection and control device.

7. The computer implemented method of claim 5, wherein determining whether the suggested course of action has been completed comprises receiving, from at least one of a mobile device and the detection and control device, a response to the suggested course of action.

* * * * *